(12) United States Patent
Breedlove et al.

(10) Patent No.: US 10,676,663 B2
(45) Date of Patent: Jun. 9, 2020

(54) ELECTROLYTIC SYSTEM AND METHOD FOR PROCESSING A HYDROCARBON SOURCE

(71) Applicant: STRATEGIC RESOURCE OPTIMIZATION, INC., Bailey, CO (US)

(72) Inventors: John D. Breedlove, Longmont, CO (US); Michael J. Peters, Bailey, CO (US); Seth R. Mayer, Broomfield, CO (US); David D. Faulder, Littleton, CO (US)

(73) Assignee: STRATEGIC RESOURCE OPTIMIZATION, INC., Bailey, CO (US)

( * ) Notice: Subject to any disclaimer, the term of this patent is extended or adjusted under 35 U.S.C. 154(b) by 0 days.

(21) Appl. No.: 15/758,914

(22) PCT Filed: Mar. 18, 2016

(86) PCT No.: PCT/US2016/023143
§ 371 (c)(1),
(2) Date: Mar. 9, 2018

(87) PCT Pub. No.: WO2016/154002
PCT Pub. Date: Sep. 29, 2016

(65) Prior Publication Data
US 2018/0305604 A1    Oct. 25, 2018

Related U.S. Application Data

(60) Provisional application No. 62/136,204, filed on Mar. 20, 2015.

(51) Int. Cl.
*C09K 8/58*    (2006.01)
*C09K 8/03*    (2006.01)
(Continued)

(52) U.S. Cl.
CPC .............. *C09K 8/58* (2013.01); *C09K 8/03* (2013.01); *C09K 8/532* (2013.01); *E21B 43/162* (2013.01); *C09K 8/524* (2013.01); *C09K 2208/22* (2013.01)

(58) Field of Classification Search
CPC ............. C07D 401/12; C07D 401/04; C09K 2208/22; C09K 8/03; C09K 8/524; C09K 8/532; C09K 8/58; E21B 43/162
See application file for complete search history.

(56) References Cited

U.S. PATENT DOCUMENTS 3,925,172 A * 12/1975 Voorhies .................. C25B 3/00
                                                        205/431
2005/0224230 A1* 10/2005 Cobb ........................ C09K 8/58
                                                        166/266

(Continued)

FOREIGN PATENT DOCUMENTS

| CN | 109730239 A * | 5/2019 | |
|---|---|---|---|
| WO | WO-2009049358 A1 * | 4/2009 | .............. C10G 1/00 |
| WO | WO-2015020116 A1 * | 2/2015 | .............. A61K 8/34 |

OTHER PUBLICATIONS

Google Translation of WO2015020116. (Year: 2015).*

*Primary Examiner* — Zakiya W Bates
(74) *Attorney, Agent, or Firm* — Greenberg Traurig, LLP

(57) ABSTRACT

The present disclosure relates to formulations comprising an electrolyzed carrier fluid, optionally with an organic solvent and/or an additive. The formulations may be applied to in-situ and ex-situ hydrocarbon sources to recover or improve the hydrocarbon material.

21 Claims, 4 Drawing Sheets

(51) Int. Cl.
  *C09K 8/532* (2006.01)
  *E21B 43/16* (2006.01)
  *C07D 401/12* (2006.01)
  *C09K 8/524* (2006.01)

(56) References Cited

U.S. PATENT DOCUMENTS

| | | | | |
|---|---|---|---|---|
| 2010/0012331 | A1* | 1/2010 | Larter | C09K 8/58 |
| | | | | 166/401 |
| 2011/0062032 | A1* | 3/2011 | Peters | E21B 43/16 |
| | | | | 205/766 |
| 2011/0303423 | A1* | 12/2011 | Kaminsky | C09K 8/58 |
| | | | | 166/400 |
| 2013/0014952 | A1* | 1/2013 | Hopkins | E21B 43/16 |
| | | | | 166/308.1 |
| 2014/0360936 | A1* | 12/2014 | Taylor | B01D 9/0054 |
| | | | | 210/636 |

* cited by examiner

ELECTROLYTIC SYSTEM AND METHOD FOR PROCESSING A HYDROCARBON SOURCE

CROSS-REFERENCE

The present application claims the benefit of the filing date of provisional application U.S. Ser. No. 62/136,204, filed Mar. 20, 2015, and entitled "Electrolytic System and Method for Processing a Hydrocarbon Source," the disclosure of which is incorporated herein by reference in its entirety.

TECHNICAL FIELD

The present disclosure generally relates to electrolytic systems and methods for processing hydrocarbon sources, both in-situ and ex-situ. In particular, the present disclosure relates to electrolytic systems and methods for sulfur recovery and removal, oil sand and bitumen extraction, well completion, well stimulation, production operation applications, and using electrolytic additives systems.

BACKGROUND

Sulfur, sulfur ions, and sulfur compounds in hydrocarbon sources, such crude oil, natural gas, coal, oil and tar sands, bitumen resources and asphalts, lowers the value of the resource and renders the hydrocarbons more difficult to process into higher value products, with greater capital and equipment requirements. Similarly, sulfur minerals, ions, and compounds complicate the processing of mineral ores and concentrates. These components can be released into the environment if combusted, smelted, roasted or otherwise industrially processed without the removal of the sulfur compounds.

Moreover, a large worldwide resource is contained in oil and tar sands, bitumen resources, and asphalts generally recognized to be the remnants of a lighter hydrocarbon reservoir that has undergone oxidation and biologic degradation of the lighter hydrocarbon components to heavier molecular components in the shallow crust. The degradation of the resource can cause either oil-wet or water-wet wettability conditions, and adhesion to the sand and geologic media in which it resides, depending on a host of digenetic, lithologic, and geologic history variables. Commercial interest in the recovery of liquid hydrocarbons from shallow and other poorly consolidated sediments is driven by the tremendous size of the resource base compared to conventional oil, and their concentrated accumulations. These factors have supported increased demand for technologies capable of increasing efficiencies in the production of unconventional oil resources.

Current oil sand operations, however, rely on the large scale application of heat, surfactants, alkaline materials and other chemicals to process and separate hydrocarbon sources from the host geologic media, resulting in variable operating costs and a large and burdensome fixed capital structure. Alternatively, hydraulic fracturing techniques use "slickwater" fracturing fluids typically comprising water, friction reducers and a biocide for low permeability and shale hydrocarbon resource development. This technology uses large volumes of water with low concentrations of friction reducers, biocides and other additives injected at high volumes and pressures (>50 barrels per min (bpm), at >5000 psi) to break down the geologic media, creating dendritic fractures in the rock, increasing the surface area in communication with and creating permeable pathways to the wellbore, releasing trapped hydrocarbons.

SUMMARY

In view of the foregoing, briefly therefore provided herein are formulations comprising an electrolyzed carrier fluid and at least one organic solvent. The organic solvent may be selected from the group consisting of methanol, ethanol, propanol, acetone, ethyl acetate, ethyl lactate, toluene, petroleum distillates, and combinations thereof. For example, the organic solvent is selected from lower alkanol, lower ketone, and combinations thereof, in particular, the organic solvent may be ethanol, acetone, or combinations thereof, such as a combination of ethanol and acetone in a volume-to-volume ratio from 1:3 to 3:1.

The formulation may comprise between 50% and 90% (by volume of the total composition) electrolyzed carrier fluid, between 5% and 45% (by volume of the total composition) ethanol, and between 5% and 45% (by volume of the total composition) acetone. More specifically, the formulation may comprise between 88% and 90% (by volume of the total composition) electrolyzed carrier fluid, between 3% and 4% (by volume of the total composition) ethanol, and between 6% and 8% (by volume of the total composition) acetone.

The formulation may further comprise at least one additive. When present, the additive may be selected from the group consisting of nanoparticles, lignal sulfonates, octyl phenols, non-octyl phenols, amine oxides, ethoxylated alcohols, sarcosine, sarcosinate, a hydroxide source, and combinations thereof. When the additive is a hydroxide source, it may be selected from potassium hydroxide, sodium hydroxide, calcium hydroxide, magnesium hydroxide, and combinations thereof. Sometime the electrolyzed carrier fluid may have a reductive electrochemical potential compared to baseline potential of carrier fluid before electrolysis as measured millivolts (mV).

The present disclosure also provides formulations comprising an electrolyzed carrier fluid and at least one additive. These formulations may further comprise at least one organic solvent.

Also provided herein are electrolytic methods for processing a hydrocarbon source. Such methods comprise providing a formulation described herein. The formulation is contacted with a hydrocarbon source. The formulation is recovered from the hydrocarbon source to provide a component from the hydrocarbon source.

In any instance, the electrolyzed carrier fluid may be provided by flowing a carrier fluid through a container, the container having a first outlet located proximal to a first electrode of a pair of electrodes and a second outlet located proximal to a second electrode of the pair of electrodes. A potential is applied to the pair of electrodes through the carrier fluid in the container to produce a first electrolyzed carrier fluid at the first electrode and a second electrolyzed carrier fluid at the second electrode. The electrolyzed carrier fluid is then selected from the first electrolyzed carrier fluid, the second electrolyzed carrier fluid, and combinations thereof. The carrier fluid may be selected from a brine feedstock and fresh water. An additive, when present, may be added to the carrier fluid before flowing through the container, or the additive may be added at substantially the same time as the carrier fluid is flowing through the container.

The hydrocarbon source may be in situ (that is, still in the ground), or ex situ (previously produced or mined). The processing of the hydrocarbon source chosen from the group consisting of well drilling, cementing, completion, stimulation, hydraulic fracturing, remedial activities, production, injection, recovery, and combinations thereof. The method may further comprise flushing the hydrocarbon source with aqueous potassium chloride.

The present disclosure further provides a system for purifying a hydrocarbon source. Such systems comprise a source of carrier fluid, a source of organic solvent and a subsystem. The subsystem comprises a pair of electrodes interposed by a permeable membrane to create a first channel and a second channel; a source of electricity for applying a potential to the pair of electrodes to produce a first electrolyzed decontamination solution in the first channel and a second electrolyzed decontamination solution in the second channel; an application unit in fluid communication with the subsystem for applying the solvent and one of the first electrolyzed carrier fluid and the second electrolyzed carrier fluid to a hydrocarbon source; and a recovery unit for recovering the organic solvent, the at least one of the first electrolyzed carrier fluid and the second electrolyzed carrier fluid, and the contaminant from the substrate. The potential of the solutions within the system may be controlled by adjusting one or more of current density, total dissolved solids, additives, electrode plate size and type, membrane type, voltage, fluid residence time, and any combination thereof.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification and the drawings, which forms a part of this disclosure.

BRIEF DESCRIPTION OF THE DRAWINGS

The disclosure will be readily understood by the following detailed description in conjunction with the accompanying drawings, wherein like reference numerals designate like structural elements. The drawings provide exemplary embodiments or aspects of the disclosure and do not limit the scope of the disclosure.

DETAILED DESCRIPTION

Figure 1:
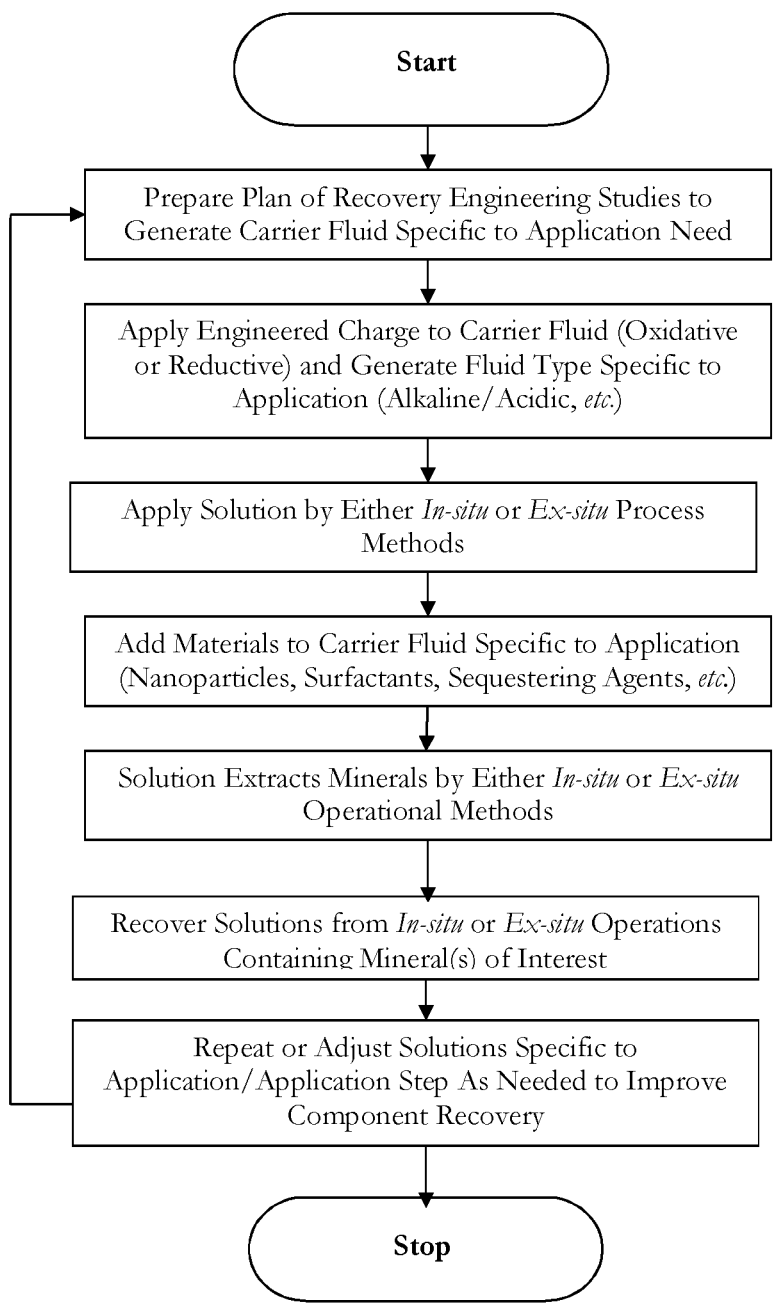
FIG. 1 diagrams the component recovery process using the system and methods disclosed.
Figure 2A:
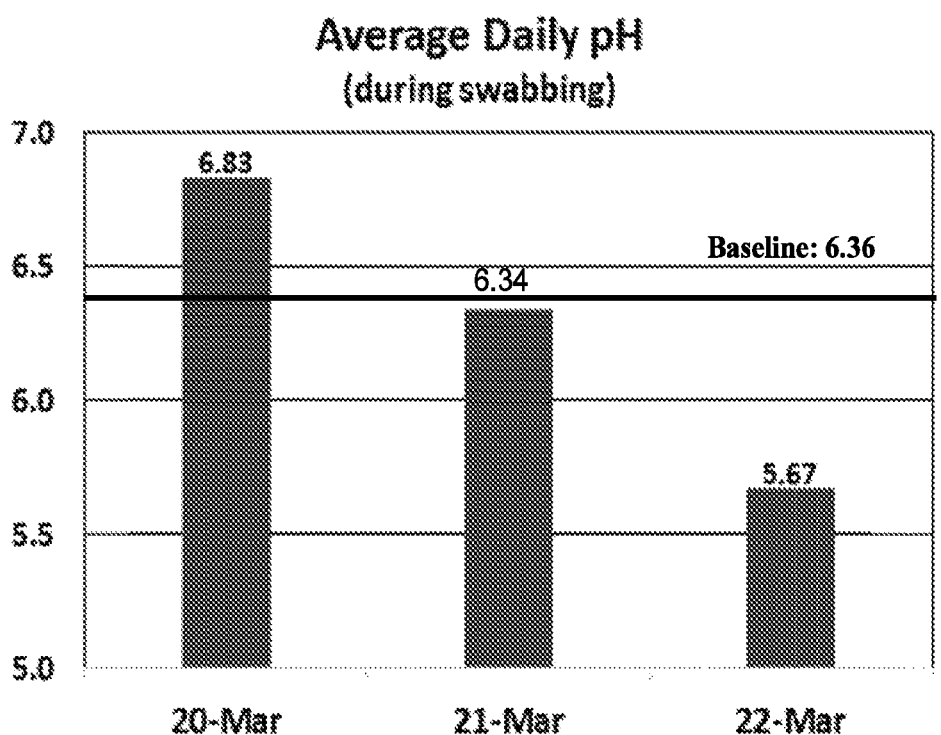
FIG. 2A shows the average pH during swabbing after treating a well with a formulation described herein.
Figure 2B:
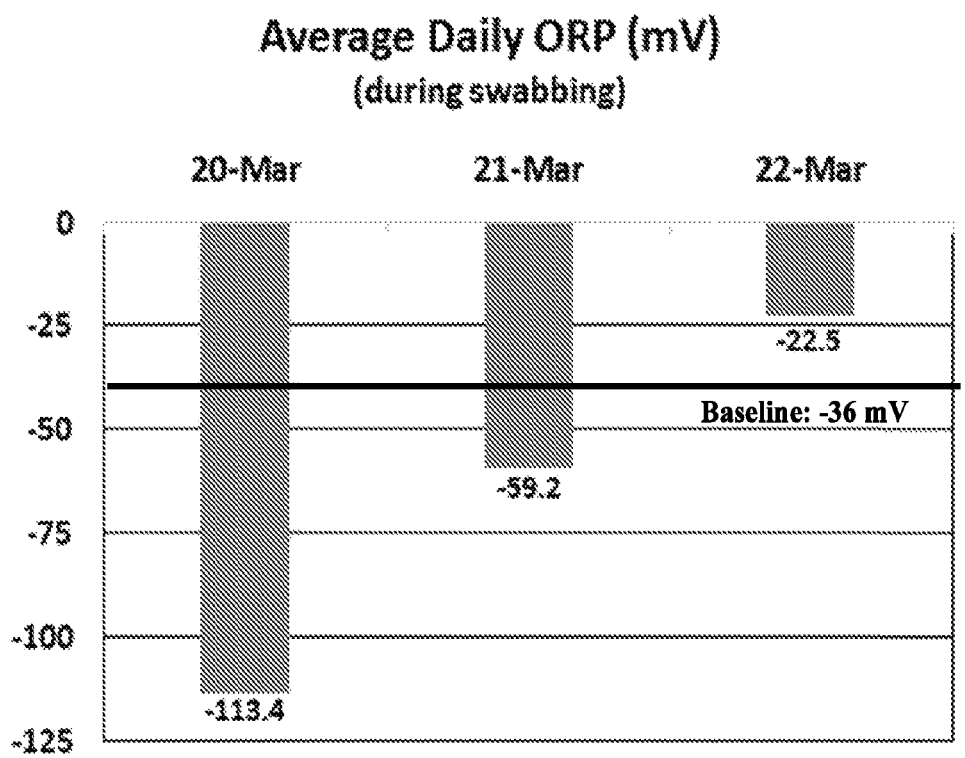
FIG. 2B shows the average ORP during swabbing after treating a well with a formulation described herein.

The present disclosure increases the recovery efficiency of hydrocarbon sources from sand, unconsolidated sediments, rocks, and other geologic media. This effect is achieved by either ex-situ or in-situ extraction technologies in an engineered and controlled manner, increasing the water wettability of the solid particles, releasing the hydrocarbon sources, reducing mechanical, thermal, and chemical inputs, improving extraction efficiency, reducing capital and operating costs, and allowing additional development of the hydrocarbon resource base. In particular, energized electrolyzed carrier fluids improve recovery efficiency from existing and lower quality mineral and other component deposits through lower direct chemical usage and more effective processing by the extraction equipment. The combined effect is a lower variable cost structure and an expanded resource base through the economic extraction of lower grade resources.

The present disclosure provides a formulation comprising an electrolyzed carrier fluid, organic solvent or solvents, and/or other additives such as surfactants, chelants and buffering agents. The present disclosure provides a system and method using any formulation described herein. These formulations, methods, and systems accomplish hydrocarbon recovery efficiencies at lower operating costs and increased economic efficiency, thereby expanding market development of the underlying resource base.

Formulations

The present disclosure provides a formulation comprising an electrolyzed carrier fluid and at least one organic solvent. The formulation may comprise an electrolyzed carrier fluid and at least one additive, and optionally, at least one organic solvent for well treatments. Other formulations comprising an electrolyzed carrier fluid and additives for sulfur removal and/or oil sand and bitumen removal.

The electrolytic carrier fluid may have a pH and oxidative-reductive potential (ORP) selected to improve component removal efficiency. Increasing the reducing potential (adding electrons) typically results in a more alkaline electrolytic carrier fluid pH (>7.0). Conversely, lowering the reducing potential (removing electrons) typically results in a more acidic electrolytic carrier fluid pH (<7.0). The electrolyzed carrier fluids may be modified with various compounds to improve hydrocarbon, mineral, ore, unwanted contaminant and other component recovery, removal and processing. Thus, the electrolyzed carrier fluid may be either reducing or oxidizing.

Generally, to form an electrolytic carrier fluid, the carrier fluid contains at least one ionic salt. Ionic salts used to electrolytically generate fluids may include, but are not limited to, sodium chloride (NaCl), potassium chloride, (KCl), potassium nitrate ($KNO_3$), potassium hydroxide (KOH), sodium nitrate ($NaNO_3$), sodium phosphates, ($NaH_2PO_4$, $Na_2HPO_4$, $Na_3PO_4$), potassium phosphates ($KH_2PO_4$, $K_2HPO_4$, $K_3PO_4$), sodium sulfate ($Na_2SO_4$), potassium sulfate ($K_2SO_4$), sodium fluoride (NaF), sodium chlorite ($NaClO_2$), sodium iodide (NaI), sodium bromide (NaBr), sodium borate (e.g. $Na_2B_4O_7 \cdot 10H_2O$), and other applicable salts or combination of salts that can create electrolyzed carrier fluids with sufficient energized properties and charges. Many ionic salts have been used for industrial, commercial, agricultural, and residential applications for decades. These materials dissociate in water or other polar solvents, forming acids and bases. Salts may be used at concentrations that vary from a few parts per million (ppm) or less to over 200,000 ppm, depending on the application and process desired.

Solid ionic salts such as, but not limited to, sodium chloride (NaCl), potassium chloride (KCl), sodium fluoride (NaF), potassium nitrate ($KNO_3$) and others, may be dissolved into an aqueous solution. Energized acids and bases may be prepared onsite by processing the aqueous solution with a split or non-split electrolytic cell. Energized electrolytic acids and bases with highly reactive oxidative-reductive properties may be generated, such as hydrochloric acid (HCl), hydrofluoric acid (HF), sodium hydroxide (NaOH), potassium hydroxide (KOH), and other substances commonly used for well service activities.

The formulation may comprise an organic solvent. Generally, organic solvents may be classified as aprotic or as protic. Non-limiting examples of suitable aprotic organic solvents include acetone, acetonitrile, diethoxymethane, N,N-dimethylformamide (DMF), dimethyl sulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, N,N-dimethylacetamide (DMAC), 1,4-dioxane, N-methyl-2-pyrrolidinone (NMP), ethyl acetate, ethyl formate, ethyl methyl ketone, formamide, hexachloroacetone, hexamethylphosphoramide, methyl acetate, N-methylacetamide, N-methylformamide, methylene chloride, nitrobenzene, nitromethane, propionitrile, sulfolane, tetramethylurea, tetrahydrofuran (THF), 2-methyl tetrahydrofuran, trichloromethane, and combinations thereof.

Suitable examples of protic organic solvents include, but are not limited to, methanol, ethanol, isopropanol, n-propanol, isobutanol, n-butanol, s-butanol, t-butanol, formic acid, acetic acid, water, and combinations thereof.

Other suitable organic solvents include, but are not limited to, alkane and substituted alkane solvents (including cycloalkanes), aromatic hydrocarbons, esters, ethers, ketones, combinations thereof, and the like. Specific organic solvents that may be employed, include, for example, acetonitrile, benzene, butyl acetate, t-butyl methylether, t-butyl methylketone, chlorobenzene, chloroform, chloromethane, cyclohexane, dichloromethane, dichloroethane, diethyl ether, ethyl acetate, diethylene glycol, fluorobenzene, heptane, hexane, isobutylmethylketone, isopropyl acetate, methylethylketone, methyltetrahydrofuran, pentyl acetate, n-propyl acetate, tetrahydrofuran, toluene, and combinations thereof.

The organic solvent may be selected from lower alkanol, lower ketone, and combinations thereof. The organic solvent may be ethanol, acetone, or combinations thereof. The organic solvent may be a combination of ethanol and acetone in a volume-to-volume ratio from 1:3 to 3:1, for example about 1:3, about 1:2, about 1:1, about 2:1, or about 3:1.

The hydrocarbon source may be contacted with a formulation containing between about 50% and about 90% (by volume of the total composition) electrolyzed carrier fluid. For example, the formulation may contain between about 50% and about 55%, between about 55% and about 60%, between about 60% and about 65%, between about 65% and about 70%, between about 70% and about 75%, between about 75% and about 80%, between about 80% and about 85%, or between about 85% and about 90% (by volume of the total composition) electrolyzed carrier fluid.

The hydrocarbon source may be contacted with a formulation containing between about 5% and about 45% (by volume of the total composition) ethanol. For example, the formulation may contain between about 5% and about 10%, between about 10% and about 15%, between about 15% and about 20%, between about 20% and about 25%, between about 25% and about 30%, between about 30% and about 35%, between about 35% and about 40%, or between about 40% and about 45% (by volume of the total composition) ethanol.

The hydrocarbon source may be contacted with a formulation containing between about 5% and about 45% (by volume of the total composition) acetone. For example, the formulation may contain between about 5% and about 10%, between about 10% and about 15%, between about 15% and about 20%, between about 20% and about 25%, between about 25% and about 30%, between about 30% and about 35%, between about 35% and about 40%, or between about 40% and about 45% (by volume of the total composition) acetone.

The hydrocarbon source may be contacted with a formulation containing between about 50% and about 90% (by volume of the total composition) electrolyzed carrier fluid, between about 5% and about 45% (by volume of the total composition) ethanol, and between about 5% and about 45% (by volume of the total composition) acetone.

The hydrocarbon source may be contacted with a formulation containing between about 88% and about 90% (by volume of the total composition) electrolyzed carrier fluid, between about 3% and about 4% (by volume of the total composition) ethanol, and between about 6% and about 8% (by volume of the total composition) acetone.

Integral to some embodiments of the electrolytic system and method are additives to the electrolyzed carrier fluids that enhance the controlled application. These additives may be added before, within, or after the carrier fluid passes through the electrolytic cell and is electrolyzed. These additives may be naturally occurring, engineered, or manmade. These materials may be used for, but not limited to, enhancing surface wettability, creating micelles, entrapping components, buffering solutions, chelating and sequestering components, dispersing components, degreasing surfaces, removing sulfur compounds, de-scaling surfaces, solubilizing well-plugging materials, and preparing biocides. Without wishing to be bound by theory, these additives may synergistically augment and maintain the charge potential of the electrolyzed carrier fluid and may be tailored to the components, to the media of interest, or to the desired processing outcome. For example, the additives may assist in charge storage and/or transfer, and achieve other desired synergistic physical and chemical reactions in an engineered, controlled, and predictable manner both on the surface (ex-situ) and in the subsurface (in-situ).

The additive may comprise a nanoparticle. Suitable nanoparticles include, but are not limited to, buckministerfullerenes (Bucky balls), carbon nanotubes, graphite, graphene, silicates, metasilicates, clays, halloysite, catalysts, organic or biologically derived materials or other (natural or manmade) materials, or other nanoparticles that can achieve and maintain a charge potential, and any combinations thereof. The nanoparticles may be added at a few parts per million (ppm) or less to over about 100,000 ppm depending on the material and application.

The additive may comprise a wetting agent (surfactant). Wetting agents may be added to reduce interfacial tension between the solid-liquid interface, allowing capillary penetration to remove trapped components. These agents decrease surface tension and reduce the contact angle between the wetting phase, the solid surface or substrate, and the non-wetting phase, for enhanced electrolyzed carrier fluid penetration into subsurface capillaries and irregularities. The delivery of the electrolyzed carrier fluid satisfies the electrostatic potential of the components. These wetting agents may be cationic, anionic or nonionic, and may be chosen to work with the electrolyzed carrier fluids in concentrations ranging from less than about 1% to more than about 10%, depending on the application. Although many agents can be used, some common useful agents include, but are not limited to, lignal sulfonates, octyl phenols, non-octyl phenols, amine oxides (such as decyldimethylamine oxide or N-dialkylmethylamine oxide) and many others, including U.S. Environmental Protection Agency (EPA) Design for Environment (DfE) agents, such as ethoxylated alcohols, sarcosines/sarcosinates, sulfonates or similar materials.

Various foaming agents can be added to provide logistical advantages in application, treating time, and contact time, both in-situ and ex-situ.

Once a component is released from the substrate or solid surface, it may be sequestered to enable removal and eliminate reattachment to the substrate or surface. Successful sequestration of a wide range of materials can be accomplished effectively and economically using chelating or sequestering agents such as, but not limited to, humic acids, fulvic acids, citric acid, gluconates, and ethylenediaminetetraacetic acid (EDTA). These materials may be added in concentrations from less than about 1% to more than about 10%, depending on the application.

The electrolyzed carrier fluids may include buffering agents, which adjust fluid pH, reduce corrosivity, stabilize fluids for interim storage, enable specific physical or chemical reactions or otherwise engineer, and optimize fluids for one or more applications. These buffering agents may include, but are not be limited to, monovalent carbonate, divalent carbonate, bicarbonate, hydroxide, organic or biologically derived materials or other suitable compounds. Other additives, such as nanoparticles (among others), may also be included to electrolytically change the charge potential in an engineered and controlled manner.

The additive may be a hydroxide source. The hydroxide source may be selected from potassium hydroxide, sodium hydroxide, and combinations thereof. The hydroxide source may also be selected from the group consisting of potassium hydroxide, sodium hydroxide, calcium hydroxide, magnesium hydroxide, and combinations thereof.

Electrolytic Methods and Systems

In various aspects of the present disclosure, the formulations described herein may be produced using an electrolytic system. In other aspects, any formulation described herein may be applied through various methods.

The system and method of the present disclosure may use a split electrolytic cell, with or without a semi-permeable membrane, or other process that can impart a reductive or oxidative charge into a fluid, and having the ability to ionize fluids above or below a baseline electrochemical potential. The configuration of an ionization apparatus may include systems using simple electrolysis with or without a membrane (e.g., ported systems or other configurations), variations in plate configurations, types or materials, or any other embodiments that can produce an electrolyzed carrier fluid in adequate volumes and quantities to generate beneficial results during processing a hydrocarbon-bearing stratum, minerals, components, or other substances. A carrier fluid passing through a split electrolytic cell produces two streams of electrolyzed carrier fluids; one stream containing a reductive electrolyzed carrier fluid (excess of electrons) and the second containing an oxidative electrolyzed carrier fluid (deficit of electrons) compared to baseline potential measured in millivolts (mV). Other embodiments that can produce an electrolyzed carrier fluid may have different configurations, altering the output to a reductive or oxidative preference.

The electrochemical properties of the electrolyzed carrier fluid may be modified and used to extract hydrocarbons, minerals, components, or other substances by directly manipulating the reduction-oxidation state at the solid-liquid interface in a medium. An electrolyzed carrier fluid passing through a porous media may release hydrocarbons or other mineral components by directly manipulating chemical and electrochemical reactions and/or through changes in reductive/oxidative (redox) potentials, and hydrocarbon recovery may be enhanced through an engineered shift in the zeta potential ($\zeta$-potential) at the solid-liquid and liquid-liquid interfaces.

The electrolytic system disclosed herein applies to processing any hydrocarbon source and any facility used to process a hydrocarbon source, such as wells, production facilities, gathering lines, pipelines, tanks, and refineries. "Processing" broadly encompasses all activities related to generating a refined hydrocarbon product, including, but not limited to, drilling, completing, producing, extracting, separating, refining, purifying, petroleum well services, removing sulfur compounds from crude oil, and more efficient processing of oil sands and bitumen resources, both in situ and ex situ.

A well, conveyer, auger, slurry, or other means, delivers, injects, produces, treats, or processes components from the subsurface, within the subsurface, or on the surface.

Further, the system disclosed herein may control the electrochemical state of the substrate either with lesser amounts of or completely without expensive or complex chemicals, thereby reducing overall project costs and logistical requirements. Thus, wells may be treated to enhance production. "Sour crude" with high sulfur content may be treated for sulfur removal. Hydrocarbons may be extracted from oil sands at a cost lower than conventional methods, advancing the state-of-the-art and allowing increased penetration into the underlying resource base.

The system may comprise an electrolytic apparatus or "cell," with or without a semi-permeable membrane, or other process that can embark a reductive or oxidative charge into a fluid, to selectively generate two electrolyzed carrier fluids, one with an excess of electrons (reductive) and the other with a deficit of electrons (oxidative). Due to water dissociation with a set of charged electrodes, the alkaline water contains free hydrogen, and the acidic water contains free oxygen and possibly chlorine or other anodic gasses, both in a highly energized state and available for chemical reaction. The two fluid streams have highly energized oxidative-reductive potential (ORP) compared to the input carrier fluid and compared to standard acids and bases, with the alkaline/reductive electrolyzed carrier fluid shifting to a more negative state (−mV) and the acidic/oxidative electrolyzed carrier fluid to a more positive state (+mV). The electrolyzed carrier fluids are highly energized and enhance chemical reactions that would not otherwise happen under similar conditions. Without wishing to be bound by theory, when mixed with additives, the electrolyzed carrier fluids often enhance the performance of the additives, allowing increased effectiveness at lower concentrations of additives, reducing treating costs.

The system and method can generate electrolyzed carrier fluids for the completion and servicing of wellbores penetrating a geologic medium for extraction activities. These activities include, but are not limited to, modifying the physical and electrochemical fluid properties used for well stimulation, altering the rock wettability, improving stimulation fluid recovery, breaking of oil and water emulsions in produced fluids, treating mineral, chemical and hydrocarbon precipitates, and improving hydrocarbon recovery.

Through additives described herein, highly energized acids and bases may be generated on-site and on-demand for direct use, avoiding the transportation, logistical, safety and environmental issues commonly associated with strong acids and bases. The electrolyzed carrier fluids can also be used with or without additives to sterilize or remove algal, bacterial, viral, fungal or other microbial colonies, infestations, mats, biofilms or other biological presence in injection wells, production wells, near wellbore regions, and process equipment, and as an injected electrolyzed carrier fluid for in-situ sweetening of the hydrocarbon reservoir by eliminating sulfate-reducing bacteria in the geologic media. The electrolyzed carrier fluids can also be used for industrial degreasing, cleaning and disinfecting of oil and gas exploration, production, transportation and refining operations, equipment, tubular, pipelines, refined product transportation and storage and other associated infrastructure.

The servicing of extraction wellbores into a geologic media uses a suite of operations to drill, cement and case, complete, stimulate, operate, and remediate over the life of the well. These well service operations require large volumes of fluid to perform a wide range of activities, such as water based drilling fluids, cementing materials, completion fluids, hydraulic fracturing fluids, acidizing fluids, foams, paraffin and asphaltene solubilizing materials, re-solubilizing of mineral precipitates, well sterilization solutions, and activities to economically, efficiently, and safely operate and maintain a wellbore into the subsurface. Many specialized fluids have engineered properties to achieve certain design specifications beneficially altered by adding electrolytic carrier fluids with charge potentials and additives. The charge potential shifts the electrostatic state, $\zeta$-potential, free energy, solubility, or other properties acting on a substrate, internal surface area within a porous media, or other spatial dimension with an interface between a solid-solid, solid-liquid, and liquid-liquid. The wettability at the surface is beneficially changed, resulting in the enhanced release of hydrocarbons, mineral substances, ores, deposits and components. Solvents also solubilize blockage materials to remove them from the wellbore and surrounding formation.

Research, commercial or academic, using an electrolyzed carrier fluid, with or without additives, in a rock core, sandpack, micro-models, and other geologic or man-made media for fluid, ore, mineral, and component recovery studies are explicitly included and reserved by this application. For example, one may explore electrolyzed carrier fluids and methods to conduct specific petrophysical investigations, studies, measurements, or other activities using rock core, sandpack, glass beads, micro-models, and other geologic or man-made materials, or manufactured media for fluid, hydrocarbon, ore, mineral, and other component recovery studies. Investigations may include, but are not limited to hydrocarbon or mineral recovery efficiency, measurements of $\zeta$-potential or other surface energies acting at the solid-liquid and liquid-liquid interfaces, interfacial tension measurements between solids and liquids, capillary pressure imbibition and drainage behavior, multi-phase relative permeability, dielectric properties, wettability state, component recovery efficiencies, and other measurements designed to quantify the behavior of electrolyzed carrier fluids. These investigations are claimed by the present application.

The production of sour crude oil or natural gas, containing hydrogen sulfide ($H_2S$), is the primary source of sulfur in hydrocarbon fuels. The described electrolytic system uses common salts to generate an aqueous solution that is then passed through a split electrolytic cell. The aqueous solution is electrolyzed, generating two electrolyzed carrier fluids, an oxidizing and a reducing, above or below a baseline charge potential, which serves to either accelerate or retard chemical reactions. In this example, we wish to remove or reduce $H_2S$ entrained in a hydrocarbon source by accelerating reactions with electrolyzed hypochlorous acid. The hypochlorous acid is generated by using NaCl or other ionic salts dissolved in water as an input carrier fluid into an electrolytic cell. By controlling various inputs, such as brine concentration, fluid flow rate, power input and electrode spacing, one can create hypochlorous acid (HOCl) solution which is highly oxidizing, with an oxidative potential commonly over +1100 mV. The other electrolyzed carrier fluid generated by the electrolytic cell is sodium hydroxide (NaOH), which is a highly reductive electrolyzed carrier fluid with a reductive potential commonly in excess of −900 mV. The $Cl_2+O_2^-$ radicals in an aqueous, pH-adjusted environment form a highly energized hypochlorous acid (HOCl), which accelerates the desired chemical reaction and removes sulfur compounds from the hydrocarbon material, and forming sulfuric acid ($H_2SO_4$):

$$H_2S+4HOCl \rightarrow H_2SO_4+4HCl^-$$

The sulfuric acid can then be mixed with the reducing hydroxide solution (NaOH) to neutralize the sulfuric acid and precipitate or flocculate sodium sulfate salt ($Na_2SO_4$), allowing for the disposal of sulfur locally instead of at a refinery:

$$H_2SO_4+2NaOH \rightarrow Na_2SO_4+2H_2O$$

The hypochlorous acid is mixed, agitated, or via other mechanical means added to the crude oil, with or without additives, to disperse into the sour crude. Alternately, the solution can be sprayed as a fine mist through natural gas, or the natural gas can be bubbled and dispersed through the hypochlorous acid solution. Treating mined, processed, or ground coal in the hypochlorous acid solution can also achieve coal desulfurization.

In a flowable oil approach, the hypochlorous acid can be added just after production at the wellhead and before the oil/water separation process. The addition of the water based hypochlorous acid can be injected into the flow line or into a reaction vessel, depending on the time to convert based on the concentration of sulfur compounds and oil gravity (viscosity). Due to the high ORP the conversion reaction to sulfuric acid is typically very fast. For high sulfur concentrations, one may repeat this process with more than one iteration of hypochlorous addition. One or more additives such as a wetting agent, solvents chelants, nanoparticles and/or buffers, as previously described, may also enhance sulfur removal.

Figure 4:
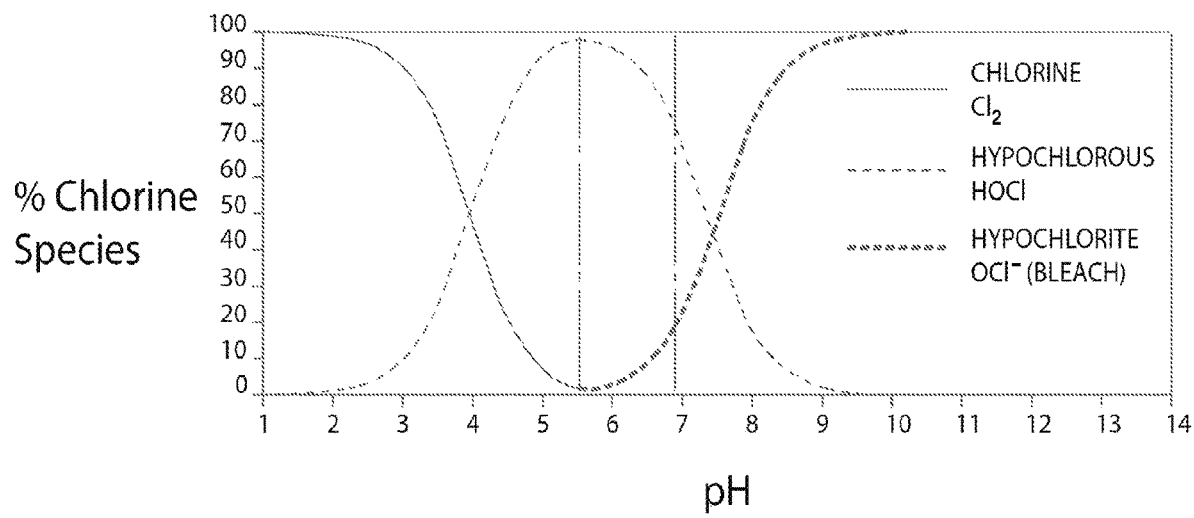
FIG. 4 is a Bubnis curve showing the percentage of chlorine species consisting of chlorine ($Cl_2$), hypochlorous acid (HOCl) and hypochlorite ion ($OCl^-$), bleach, as a function of solution pH. The figure is reproduced from Gordon, G. and Bubnis, B., "Sodium hypochlorite speciations," in *Proceedings of the American Water Works Association and Water Quality Technology Conference*, Denver, Colo., USA, Jun. 11-15, 2000, incorporated herein by reference in its entirety.

Depending on the pH of the produced oil/water fluids, the oxidative electrolyzed carrier fluid may be buffered to better achieve a more active form of hypochlorous acid. As can be seen in the Bubnis curve at FIG. 4, the concentration of hypochlorous acid is a function of pH, so controlling the pH can control the concentration of hypochlorous acid in the oxidative electrolyzed carrier fluid. This buffering can also help reduce potential damage to the oil product from over oxidation.

In a subsequent step, a neutralizing sodium hydroxide may be added to neutralize the sulfuric acid to sodium sulfate along with neutralizing any remaining hypochlorous acid. This highly reductive process also helps shift the electrolyzed carrier fluid back to a more reductive state limiting the damage to the oil product. Again, the water-based hydroxides may be injected into the flow line or into a reaction vessel depending on how long the reaction takes based on the residual concentration of hypochlorous and oil gravity (viscosity).

The produced oil/water and added components may be processed through an oil-water separator or cyclone to collect the oil product.

A similar process may be implemented for natural gas with a spray or mixing system and the subsequent neutralization step before separating the water from the gas. In a coal process, crushing the coal can increase the surface area before treatment to decrease treatment time. A wetting agent as previously described may also improve contact of the sulfur treatment fluids.

The recovery of oil sands, tar sands, bitumen resources, and asphalt deposits is becoming increasingly important as fewer large-scale, economically feasible conventional hydrocarbon reserves are being discovered. These lower-quality resources are generally remnants of lighter hydrocarbon reservoirs that have undergone oxidation and biologic degradation of the lighter components into heavier molecular components in the shallow planetary crust. The degradation of the resource can result in either oil-wet or water-wet conditions, accompanied by adhesion to the sand and geologic media in which it resides, depending on a host of historical, diagenetic, lithologic, and geologic variables. Commercial interest in the recovery of liquid hydrocarbons from these resources is driven by the tremendous size of the resource base compared to conventional oil, and their concentrated accumulations.

However, current oil and tar sand operations rely on the large-scale application of heat, surfactants, alkaline materials, and other chemicals to separate and process hydrocarbon sources from the host media, resulting in variable operating costs and a large and burdensome fixed capital structure.

The process disclosed herein efficiently and cost-effectively recover these resources, compared to existing commercial methods. Applying electrolyzed carrier fluids, either with or without additives, shifts the wettability of the hydrocarbon material and releases it from the entrained geologic media.

Electrochemical Potentials

Zeta potential ($\zeta$-potential) at a solid-liquid interface comprises three separate charges: an electrical, a structural, and Van der Waals forces. The charged layers at the solid-liquid interface behave mathematically as two parallel surfaces of opposite electrical charge separated by a distance of molecular dimensions. A layer of one charge on the solid surface and a layer of opposite charge in the layer of fluid directly adjacent to the solid surface (Stern Layer) have a differing potential. The outer region where a balance of electrostatic forces and random thermal motion determines the ion distribution is the diffuse layer. The potential at this boundary (surface of hydrodynamic shear) is the $\zeta$-potential. The $\zeta$-potential acts on the solid-liquid interface at the surface of hydrodynamic shear. If electrical forces displace or change the charge, material can either be released from or entrapped to the solid-liquid interface. Altering the $\zeta$-potential at the solid-liquid interface beyond some threshold delta charge will release an electrostatically bound component. By introducing an electrolyzed carrier fluid at the solid-liquid interface, the charge on the electrolyzed carrier fluid changes and shifts the $\zeta$-potential, allowing the component to be more tightly bound or more relaxed from the substrate, depending on whether an oxidative or reductive electrolyzed carrier fluid is used, respectively.

Substrate-fluid mechanisms operate at a different textual scale with fluid saturations related to the pore throat radius and the resulting capillarity. At a much finer spatial scale, where surface active forces dominate, the accommodation of surface charge and the charge of the contiguous fluids influence imbibition at the solid-fluid interface. This interface has a width approximately several molecular dimensions. The charge between the surface and the fluid is called the zeta potential ($\zeta$-potential) charge boundary. The imbibition affects the properties that control release of the component.

Particles dispersed in a solution are electrically charged due to their ionic and dipolar attributes in the electrolytic system. The dispersed particles are surrounded by oppositely charged ions and an outer diffuse layer, with the whole area being electrically neutral (the difference being the $\zeta$-potential). As the potential between a solid and the fluid decreases, the particles have a tendency to aggregate. Components are aggregated on a substrate, but when an electrolyzed carrier fluid is introduced onto the substrate, the components disperse, making it easier to release, remove, or recover the components. As the potential between the particles and the electrolyzed carrier fluid approaches neutrality, the particles have a tendency to aggregate.

Without wishing to be bound by theory, van der Waals forces can act at the pore scale as a component capture mechanism. The solid-liquid interactions occur at smaller and smaller scales, approaching the region where van der Waals attractive forces are a capture and storage mechanism. Introducing excess electrons releases the non-wetting component from a substrate or solid surface, with more of the pore structure becoming water-wet. The change in the charge potential to a more negative (−mV) state increases the wetting phase wettability. Conversely, changing the charge potential to a more positive state (+mV) increases the non-wetting phase wettability.

The change in charge can be reversibly controlled by introducing an oppositely charged electrolyzed carrier fluid, directly shifting the substrate wettability state and the potential. In summary, the charge can be reversed by introducing an oppositely charged electrolyzed carrier fluid having either an excess or deficit of electrons. Since the described electrolytic process produces both types of fluid, either is available to customize the component recovery process to achieve maximum efficiency.

The theoretical and experimental verification of solid-liquid interfaces demonstrates that excess electrons, whether introduced externally by chemicals, or by on-site generation, changes the $\zeta$-potential as excess electrons are consumed, doing work, and releasing components from a substrate, solid surface, or within complex pore geometry by shifting to a more water-wet state.

Definitions

"Component" refers to any fluid, hydrocarbon, mineral, ore, substance, species, or other inorganic or biological material that exists below the subsurface having economic, market, or other desirable benefit related to its extraction.

"Electrolyzed carrier fluid" refers to any fluid discharged from an electrolytic system that may be acid, neutral, or basic, having enhanced oxidative-reductive potentials.

"Electrolytic system" refers to any device that can electrolyzed carrier fluids above or below a baseline oxidation-reduction potential (ORP). The configuration of an electrolytic apparatus may include simple electrolysis with or without a membrane (such as ported systems or other configurations), variations in plate configurations, cell designs, fluid flow channels, types of materials, or any other embodiment that can produce an electrolyzed carrier fluid adequate to generate beneficial results.

"Oil sands" refers to hydrocarbon-bearing sand, carbonate, or other unconsolidated or consolidated geologic media containing economic quantities of oil, asphalt, tar, bitumen resources, or other hydrocarbons in a degraded form and enriched in heavy hydrocarbon chained molecules.

"Substrate" refers to any surface such as rock, sandstone, carbonate, concrete, stone, steel, glass, silica, geologic or manmade medium that can support and hold an intrinsic charge.

"Miscible" refers to two or more solvents capable of being mixed in any ratio without separation.

"Immiscible" refers to two or more solvents incapable of being mixed in a ratio without separation.

The term "acyl," as used herein alone or as part of another group, denotes the moiety formed by removal of the hydroxy group from the group COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "alkyl" as used herein describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

The term "alkenyl" as used herein describes groups which are preferably lower alkenyl containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The terms "aryl" or "Ar" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl.

The terms "carbocyclo" or "carbocyclic" as used herein alone or as part of another group denote optionally substituted, aromatic or non-aromatic, homocyclic ring or ring system in which all of the atoms in the ring are carbon, with preferably 5 or 6 carbon atoms in each ring. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "halogen" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

When introducing elements of the present disclosure or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

EXAMPLES

Example 1—Treatment at the Steamboat Hansen 8-10 Well More than Doubled Production The Steamboat Hansen 8-10 well was drilled in November 2011. Through yearend 2015, the Arikaree Creek Field, Lincoln County, Colo. had a cumulative production of over 1.3 million barrels from 13 wells, but recently some wells have experienced production problems due to solid organic material plugging the near wellbore region. The black, pliable matter resembled asphatines; however, the organic solid did not dissolve using any traditional oilfield solvents. Further analysis showed that the black organic solid was a mixture of crude oil, silica, and a complex of sulfates, including iron sulfate, calcium sulfate, aluminum sulfate, and other minerals. The sulfates caused the oil to coagulate, forming the solids recovered from the well. The very high iron sulfate concentration also rendered the flowable fluid magnetic.

The electrolyzed carrier fluids described herein were very effective at breaking down the non-flowable solid into a flowable fluid. Laboratory studies showed a treatment dissolved the organic solid, would remove it from the well, and leave the contacted reservoir in a condition more conducive to flowing hydrocarbons. The formulation consisted of 4% (v/v) ethanol, 8% (v/v) acetone, and 88% (v/v) fresh water electrolyzed onsite as described herein to become a reductive electrolyzed carrier fluid.

Formulation containing reductive electrolyzed carrier (6,340 gallons, 151 bbls) was pumped down a Model R packer on 2⅞ tubing on Mar. 20, 2015. This treatment consisted of about 230 gal/ft solvent over a 29-ft perforated interval. The formulation was then displaced with 20 bbls of 2% KCl(aq). Pressures declined about 300 psi during the job, with possible ball action observed, suggesting diversion among the different perforations. Injection averaged 3.7 barrels per minute (bpm) while the treatment fluid was being pumped. Total pump time, including the KCl displacement, was 50 minutes. This volume was sufficient to verify the formulation's effectiveness at reestablishing production, though larger volumes may be used, as discussed below.

The Steamboat Hansen 8-10 was shut-in for 3 hours while flow back/clean-up operations were commenced. After 16 hours of swabbing, 181 barrels of oil, water, and a gray magnetic fluid were recovered, totaling 110% of the total pumped load. About 41 bbls recovered fluid was a gray magnetic fluid, which was a residue of the broken-down organic solids.

In an earlier report, the broken-down fluid was tan-to-rust in color. Crude oil was removed from the solid sample before being broken down to assist in identifying the solid. Doing so exposed the sample to additional oxygen and likely oxidized the iron-containing materials, thereby producing the tan-to-rust color. However, in the field, the oil was not removed beforehand, so additional aeration did not occur and the resulting fluid was gray (reduced state).

After swabbing, the well in subsequent days then produced 144 barrels of oil per day (Bopd), more than doubling the pretreatment production of about 70 Bopd. Specifically, the 30-day average before treatment was 72 Bopd and 18 barrels of water per day (bw/d). The thirteen-day average after treatment was 136 Bopd and water production increased to between 40-50 bw/d after the treatment.

pH and ORP play a critical role in the Steamboat Hansen 8-10's ability to produce hydrocarbons. Baseline pH and ORP measurements of the produced water were taken before the job and then compared to the same measurements and after the job. Baseline data from the Spergen formation in the Steamboat Hansen well had an average pH of 6.36, and average ORP of −36 mV, and the average measurements for the first three days of swabbing are presented below. As Tables 1 & 2 illustrate, the daily pH returns to pretreatment (baseline) levels on the second day of swabbing while the ORP takes about two days. Here, the ORP measurement is lower than pretreatment levels, which may indicate sulfate reactions or possibly a fouled ORP meter.

TABLE 1 pH and ORP (mV) Data (during swabbing operations).

| Date | Time | ORP (mV) | pH | Comments |
| --- | --- | --- | --- | --- |
| Mar. 20, 2015 | 10:30 | −35 | 6.25 | Formation Water Baseline |
| Mar. 20, 2015 | 10:30 | −37 | 6.45 | Formation Water Baseline |
| Mar. 20, 2015 | 15:15 | 0 | 8.03 | Post treatment swab sample |
| Mar. 20, 2015 | 15:35 | −212 | 7.50 | Post treatment swab sample |
| Mar. 20, 2015 | 16:00 | −118 | 6.69 | Post treatment swab sample |
| Mar. 20, 2015 | 16:20 | −94 | 6.64 | Post treatment swab sample |
| Mar. 20, 2015 | 16:47 | −138 | 6.74 | Post treatment swab sample |
| Mar. 20, 2015 | 17:00 | −100 | 6.83 | Post treatment swab sample |
| Mar. 20, 2015 | 17:40 | −83 | 6.92 | Post treatment swab sample |
| Mar. 20, 2015 | 17:55 | −79 | 6.89 | Post treatment swab sample |
| Mar. 20, 2015 | 18:10 | −118 | 7.05 | Post treatment swab sample |
| Mar. 20, 2015 | 18:25 | −79 | 6.77 | Post treatment swab sample |
| Mar. 21, 2015 | 7:50 | −93 | 6.69 | First sign of recovered materials |
| Mar. 21, 2015 | 8:25 | −100 | 6.70 | Many small grey balls in sample |
| Mar. 21, 2015 | 8:50 | −106 | 6.74 | Many small grey balls in sample |
| Mar. 21, 2015 | 9:25 | −25 | 6.43 | Magnetic properties, pH/ORP drop |
| Mar. 21, 2015 | 9:40 | −10 | 6.38 | Massive grey chunks |
| Mar. 21, 2015 | 10:25 | −21 | 6.31 | Massive grey chunks |
| Mar. 22, 2015 | 8:40 | −24 | 6.39 | Lots of grey material |
| Mar. 22, 2015 | 9:20 | −21 | 6.28 | Lots of grey material |
| Mar. 24, 2015 | 8:05 | 107 | 5.67 | Sulfide Reaction? |

While on location, the cathodic protection system was analyzed to monitor the state of the water before and after the well treatment. With the system off for a few days before injection of the formulation containing the electrolyzed carrier fluid, the baseline for the system was measured. Other measurements are shown at Table 2 below, providing statistically significant shifts above the baseline:

TABLE 2

Voltage as a function of injection time.

| Injection Time (hours) | Voltage (V) | Shift from Baseline |
| --- | --- | --- |
| 0 (Baseline) | 1.235 V | 0 V |
| 1 | 1.825 V | 0.589 V |
| 2.5 | 1.783 V | 0.548 V |
| 4 | 1.740 V | 0.505 V |
| 7 | 1.630 V | 0.395 V |
| 24 | 1.582 V | 0.347 V |
| 72 | 1.481 V | 0.246 V |
| 96 | 1.410 V | 0.175 V |

As seen above, the system measured the relevant voltage shift and subsequent decay. Data also indicate the curve decays in the first few hours, then flattened after about 24 hours, suggesting the formulation should not be left longer than about 24 hours before producing back the load. Importantly, a simple one channel data logger could monitor the voltage shift during injection and swabbing operations for quality assurance and control of the treatment.

Future well treatments may be improved by increasing total treatment volume. Increased volume should translate to deeper treatment into the reservoir surrounding the wellbore, more organic solid removal, and perhaps enhanced permeability in the near wellbore regions and the contacted reservoir. The volume of formulation may be increased or more repeated intervals of formulation followed by a 2% KCl(aq) flush. Other additives in the 2% KCl(aq) stages may enhance production. Wellbore cleanout of waxes and asphaltines in the tubing and wellbore before the formulation is injected should maximize the amount electrolyzed carrier fluid going into the formation. The well may also be stimulated with a small (few thousand gallon) low-molarity acid job before the formulation is introduced. An exemplary method may include pumping an acid job, waiting few hours, swabbing back solids and load, pumping reductive formulation, waiting for reaction to complete, swabbing and returning the well to production. This treatment strategy would change the ORP from oxidizing to reductive, enhancing the treatment by the rapid ORP shift.

Figure 3:
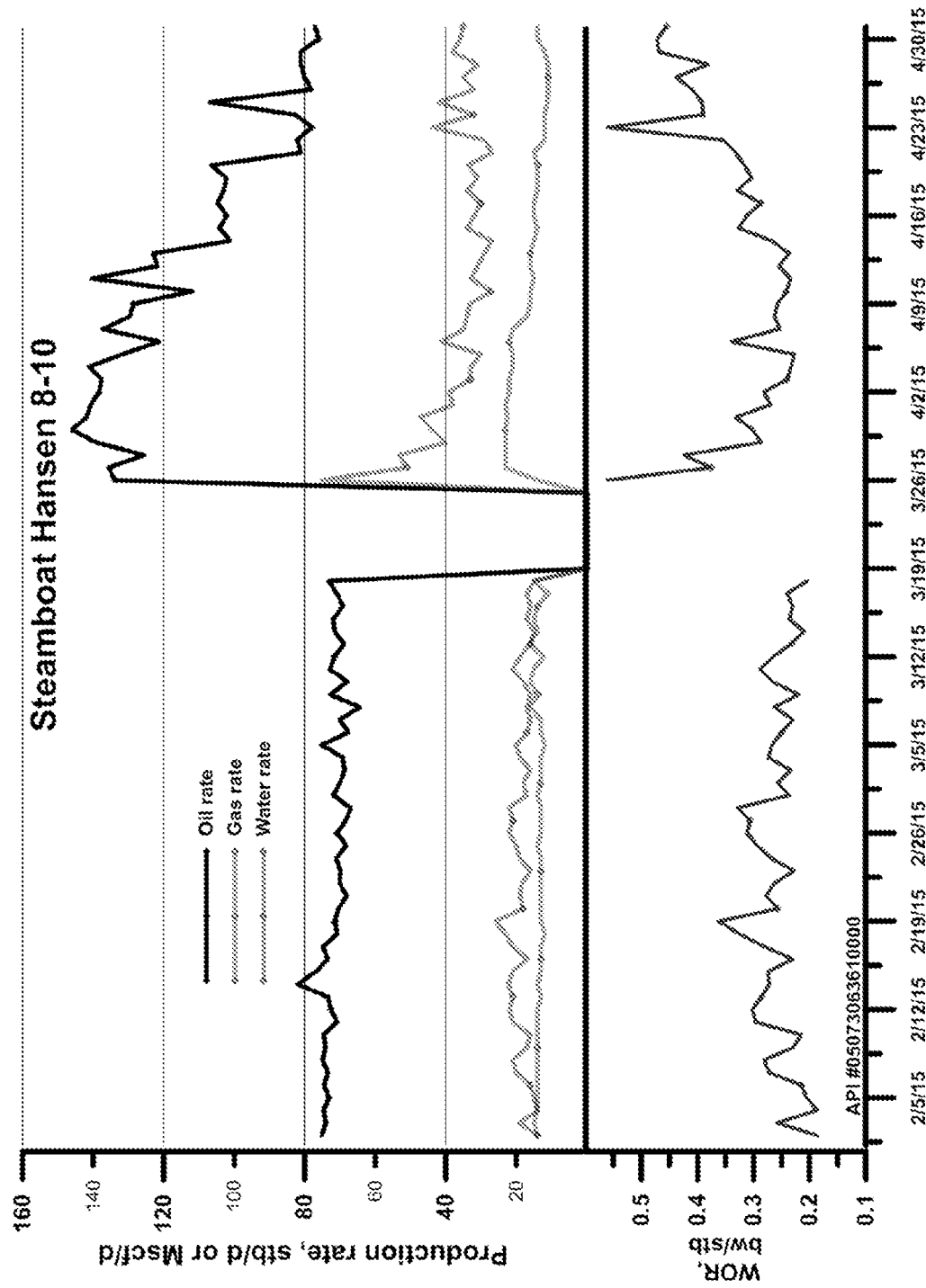
FIG. 3 shows the water-oil ratio trend before and after treating the Steamboat-Hansen 8-10 well for about three months with a formulation described herein.

The well production behavior before and after the treatment are presented in FIG. 3. Production analysis before and after the treatment focused on the production response and the water-oil ratio (WOR). Theoretical considerations suggest that introducing a electrolyzed carrier fluid with excess electrons will release oil from the rock and replace with water as the wettability becomes more water-wet. The WOR response immediately after the treatment is 0.6 and declining as the treatment that was pumped was recovered. Once the treatment "load" was recovered, the WOR reached a minimum comparable to before the treatment with less variability. This suggests more of the productive formation was opened to flow, as does the dramatic increase in production rate. The first 20 days averaged 131 stb/d before starting to decline. After about a month, the well had returned to pre-stimulus oil rate. Production response and duration of treatment benefit support a larger treatment volume.

In conclusion, the formulation containing reductive electrolyzed carrier fluid effected removal of the flow-prohibiting solids produced by the Steamboat Hansen 8-10 well. Swabbing produced 41 bbls (1,763 gal) of magnetic gray fluid, a chemical byproduct of the formulation breaking down the organic solids. Removal of the solid increased production. After 16 hours of swabbing 110% of the load, and after 5½ days on pump, oil and gas production roughly doubled to 140 Bopd, while water production increased to between 40-50 bbl/day. Other anecdotal evidence likely supports the removal of the solid, including a 300 psi reduction of treatment pressure and the well going on vacuum when the Full Opening Safety Valve (TIW valve) was opened 3 hours after pumping the well. Depending on the reservoir mechanism that created the organic solid and the treatment volume, these production results could be either long or short-lived.

Table 3 below shows the estimated amount of gray magnetic fluid removed from the Steamboat Hansen well during swabbing operations. Here, only swab runs having the gray magnetic fluid are shown. In total, 41 bbls of the gray material was recovered, representing approximately 26% of the treatment volume. The gray magnetic fluid was not seen until 86 bbls of fluid was recovered from the well. Production of the gray magnetic fluid increased significantly as fluid levels decreased, which may correlate with the density of the gray material, as it is denser than oil but lighter than the water phase.

Much of the initially recovered gray material was magnetic and could be easily moved by a magnet through the glass sample container, indicating a substantial ferric content. This phenomenon decreased significantly about halfway through the recovery process. The gray material often appeared as thin gray strands in fresh samples, which condensed into beads or droplets within about 30 minutes. It is believed this phenomenon was due to the material being "extruded" through the pore throats and perforation tunnels, and then coalesced into lower energy spheres like raindrops.

TABLE 3

Gray Fluid Volume Calculation during Swabbing Operations

| Gray Fluid Fraction (%) | Swab Volume (bbls) | Swab Run Volume (bbls) | Cumulative Volume (bbls) |
|---|---|---|---|
| 0.01 | 9.4 | 0.094 | 0.1 |
| 0.05 | 0.9 | 0.045 | 0.1 |
| 0.20 | 3.7 | 0.74 | 0.9 |
| 0.25 | 3.6 | 0.9 | 2 |
| 0.40 | 3.7 | 1.48 | 3 |
| 0.50 | 1 | 0.5 | 4 |
| 0.60 | 0.9 | 0.54 | 4 |
| 0.50 | 3.6 | 1.8 | 6 |
| 0.10 | 7.4 | 0.74 | 7 |
| 0.30 | 7.3 | 2.19 | 9 |
| 0.30 | 5.2 | 1.56 | 11 |
| 0.75 | 2.1 | 1.575 | 12 |
| 0.70 | 1.8 | 1.26 | 13 |
| 0.80 | 1.9 | 1.52 | 15 |
| 0.80 | 3.7 | 2.96 | 18 |
| 0.80 | 9.2 | 7.36 | 25 |
| 0.80 | 9.1 | 7.28 | 33 |
| 0.70 | 3.7 | 2.59 | 35 |
| 0.70 | 3.6 | 2.52 | 38 |
| 0.30 | 7.6 | 2.28 | 40 |
| 0.20 | 3.7 | 0.74 | 41 |
| TOTAL: | | | 41 |

Example 2—Treating the Big Sky 4-11 Well

The Big Sky 4-11 well was also treated using a similar formulation to that used to treat the Steamboat 8-10 well (Example 1). Big Sky 4-11 is in the same geologic formation as Steamboat 8-10. The treatment was conducted over a gross perforated interval of 50 feet and consisted of 3,500 gallons formulation displaced with 46 bbls of 2% KCl. The thirty-day average before treatment was 93 Bopd and 71 bw/d. The well was placed back on production and is stabilizing.

Example 3: Treating Athabascan Oil Sands

An example is Athabascan oil sand from Fort MacMurray, Alberta, Canada. As of 2011, Canadian oil sand reserves stood at approximately 170 billion barrels. Traditional extraction methods for this enormous resource included both in-situ and ex-situ operations. Typical in-situ methods included Steam-Assisted Gravity Drainage (SAG-D), wherein a pair of horizontal wells was drilled into the oil reservoir, one a few meters above the other. High pressure steam was continuously injected into the upper wellbore to heat the oil and reduce its viscosity, causing the heated oil to drain into the lower wellbore, where it was pumped out. As in all thermal recovery processes, the cost of steam generation was a major part of the cost of oil production. In many cases, two barrels of hydrocarbon equivalent BTUs were burned to recover a barrel of oil.

Figure 5:
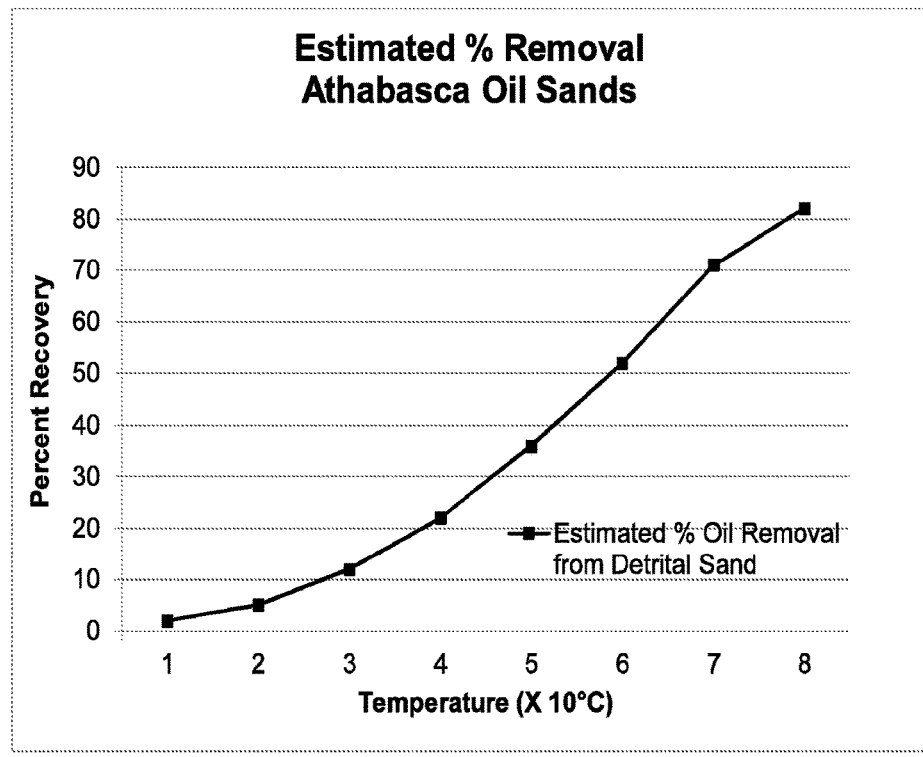
FIG. 5 is a graph of laboratory-scale recovery efficiencies of Canadian Athabasca oil sands using described "electrolyzed carrier fluids" and additives at increasing temperatures.

In laboratory-scale work, applying the reductive electrolyzed carrier fluids released the oil from the sand, and the decreased viscosity allowed the oil to be flowed or pumped, at temperatures far below those of previous SAG-D operations. In most instances, electrolyzed water temperatures of 70-80° C. had the same or similar impact as typical water heated to steam (>100° C.; FIG. 5). This represented a huge cost and energy savings, as the energy inputs to accomplish the phase change from water to steam are very significant. By comparison, the energy to electrolytically "treat" the brine solution with the reductive recovery fluid was negligible.

In the ex-situ (mined) operations in Canada, the common methods for separating the oil from the sands is the sodium hydroxide (NaOH) in a skimmer tank. With sodium chloride (NaCl) as the brine salt, the resultant reductive electrolyzed carrier fluid is a highly energized NaOH solution at low molarity. The accompanying charge potential makes the hydroxide highly reactive, efficiently releasing the oil from the sand with a small fraction of the hydroxide normally required. The cost savings were significant, especially in a remote area where everything is brought in by truck or rail. One or more additives such as a wetting agent, solvents, chelants, nanoparticles and/or buffers as previously described, may also enhance the effectiveness of the liberating fluids.

Example 4: Gilsonite (Asphaltum) Extraction

Another example was with a much lower grade resource called gilsonite or asphaltum, found in eastern Utah. Over 30 billion barrels of bitumen resources are estimated for this area, and various attempts have been made to commercially exploit the resource. The material has been mined and solvent-based ex-situ extractions attempted using various solvents, including xylene, toluene and acetone. The high cost of the solvents, the difficulty in handling and recovering the solvents, and the low level of recovery efficiency has caused failures in virtually all attempts.

Laboratory-scale testing using the technology described herein has shown that applying the reductive electrolyzed carrier fluids generated from ionic salt brines effectively separated the bitumen materials from the detrital sand grains. The reductive electrolyzed carrier fluid was directly compared to organic solvents alone (xylene, toluene, acetone), acids alone (hypochlorous acid and hydrochloric acid), and typical brines alone (such as sodium chloride), as illustrated below at Table 4.

TABLE 4

Gilsonite (asphaltum) extraction - observed recovery factors
10 gram samples, crushed gilsonite material, at 10- and
20-minute contact times, room temperature (20° C.)

| Product Tested | 10-Minute Recovery | 20-Minute Recovery |
|---|---|---|
| Xylene | <5% | <10% |
| Toluene | <10% | <15% |
| Acetone | <5% | <10% |
| Hydrochloric Acid (HCl) | <5% | <5% |
| Salt Brine | <5% | <10% |
| Electrolyzed Carrier Fluid | >85% | >90% |
| Electrolyzed Carrier Fluid with Wetting Additive | >95% | >95% |

After only between about 5 minutes and about 10 minutes of application, the reductive electrolyzed carrier fluid without any additives had removed nearly 100% of the sand and solubilized the bitumen into the water. The solvent treatments varied in efficacy from between about 1% and about 25% removal, the acids about <10% removal and the water-based brines also about <10% removal. After removing the bitumen from the detrital sand, the bitumen suspension could be easily decanted, and then added to the oxidizing component (+mV) to flocculate the bitumen into a bitumen "cake" with the sand and other detrital materials removed. Use of simple brine solutions made from local water sources to generate the electrolyzed carrier fluids represents a tremendous cost and logistical savings, while also being many times more effective as legacy methods. One or more additives such as a wetting agent, solvents, chelants, nanoparticles and/or buffers as previously described, may also enhance the effectiveness of the liberating materials.

Having described the disclosure in detail, it will be apparent that modifications and variations are possible without departing from the scope of the disclosure defined in the appended claims. While specific embodiments have been described above with reference to the disclosed embodiments and examples, such embodiments are only illustrative and do not limit the scope of the disclosure. Changes and modifications can be made in accordance with ordinary skill in the art without departing from the disclosure in its broader aspects as defined in the following claims.

What is claimed is:

1. A formulation, comprising:
   an electrolyzed carrier fluid; and
   at least one organic solvent;
   wherein the electrolyzed carrier fluid has reductive electrochemical potential compared to baseline potential of carrier fluid before electrolysis as measured millivolts (mV).

2. The formulation of claim 1, wherein the organic solvent is selected from the group consisting of methanol, ethanol, propanol, acetone, ethyl acetate, ethyl lactate, toluene, petroleum distillates, and combinations thereof.

3. The formulation of claim 1, wherein the organic solvent is selected from lower alkanol, lower ketone, and combinations thereof.

4. The formulation of claim 1, wherein the organic solvent is ethanol, acetone, or combinations thereof.

5. The formulation of claim 4, wherein the organic solvent is a combination of ethanol and acetone in a volume-to-volume ratio from 1:3 to 3:1.

6. The formulation of claim 4, comprising:
   between 50% and 90% (by volume of the total composition) electrolyzed carrier fluid, between 5% and 45% (by volume of the total composition) ethanol, and between 5% and 45% (by volume of the total composition) acetone.

7. The formulation of claim 1, further comprising at least one additive.

8. The formulation of claim 7, wherein the additive is selected from the group consisting of nanoparticles, lignal sulfonates, octyl phenols, non-octyl phenols, amine oxides, ethoxylated alcohols, sarcosine, sarcosinate, a hydroxide source, and combinations thereof.

9. The formulation of claim 8, wherein the additive is a hydroxide source selected from potassium hydroxide, sodium hydroxide, calcium hydroxide, magnesium hydroxide, and combinations thereof.

10. The formulation of claim 1, wherein the formulation comprises an additive, and wherein the additive is selected from the group consisting of nanoparticles, lignal sulfonates, octyl phenols, non-octyl phenols, amine oxides, ethoxylated alcohols, sarcosine, sarcosinate, a hydroxide source, and combinations thereof.

11. The formulation of claim 10, wherein the additive is a hydroxide source selected from potassium hydroxide, sodium hydroxide, calcium hydroxide, magnesium hydroxide, and combinations thereof.

12. An electrolytic method for processing a hydrocarbon source, the method comprising: providing a formulation according to claim 1;
   contacting the formulation with a hydrocarbon source; and recovering the formulation from the hydrocarbon source to provide a component from the hydrocarbon source.

13. The electrolytic method of claim 12, wherein the electrolyzed carrier fluid is provided by:
   flowing a carrier fluid through a container, the container having a first outlet located proximal to a first electrode of a pair of electrodes and a second outlet located proximal to a second electrode of the pair of electrodes;
   applying a potential to the pair of electrodes through the carrier fluid in the container to produce a first electrolyzed carrier fluid at the first electrode and a second electrolyzed carrier fluid at the second electrode; and
   selecting the electrolyzed carrier fluid from the first electrolyzed carrier fluid, the second electrolyzed carrier fluid, and combinations thereof.

14. The electrolytic method of claim 12, wherein the carrier fluid is selected from a brine feedstock and fresh water.

15. The electrolytic method of claim 14, wherein an additive is added to the carrier fluid before flowing through the container.

16. The electrolytic method of claim 12, wherein an additive is added at substantially the same time as the carrier fluid is flowing through the container.

17. The electrolytic method of claim 12, wherein the hydrocarbon source is in situ.

18. The electrolytic method of claim 12, wherein the hydrocarbon source is ex situ.

19. The electrolytic method of claim 12, wherein the processing of the hydrocarbon source is chosen from the group consisting of well drilling, cementing, completion, stimulation, hydraulic fracturing, remedial activities, production, injection, recovery, and combinations thereof.

20. The electrolytic method of claim 12, further comprising flushing the hydrocarbon source with aqueous potassium chloride.

21. A formulation, comprising:
   an electrolyzed carrier fluid; and
   at least one organic solvent, wherein the organic solvent is ethanol, acetone, or combinations thereof, wherein the formulation comprises:
   between 88% and 90% (by volume of the total composition) electrolyzed carrier fluid,
   between 3% and 4% (by volume of the total composition) ethanol, and
   between 6% and 8% (by volume of the total composition) acetone.

* * * * *